United States Patent [19]

Martinez

[11] 4,322,842
[45] Mar. 30, 1982

[54] BROADCAST SYSTEM FOR DISTRIBUTION AUTOMATION AND REMOTE METERING

[75] Inventor: Louis Martinez, Carson, Calif.

[73] Assignee: Altran Electronics, Harbor City, Calif.

[21] Appl. No.: 87,543

[22] Filed: Oct. 23, 1979

[51] Int. Cl.³ .............................. H04J 6/00; H04J 9/00
[52] U.S. Cl. ........................................ 370/11; 370/92; 455/353; 340/825.72
[58] Field of Search ...................... 370/11, 12, 92, 96; 455/70, 353; 179/2 AM; 340/150, 151

[56] References Cited

U.S. PATENT DOCUMENTS

| | | | |
|---|---|---|---|
| 2,719,188 | 9/1955 | Pierce | 370/92 |
| 3,553,367 | 1/1971 | Krauss et al. | 370/11 |
| 4,086,537 | 4/1978 | Asakawa et al. | 370/92 |

OTHER PUBLICATIONS

"Minimum-Bandwidth Multiplex Radioteleprinter System", by Tottingham, IEEE Transactions on Communication Technology, vol. Com-19, No. 3 Jun. 1971, pp. 241-246.

Primary Examiner—Douglas W. Olms

Attorney, Agent, or Firm—Blakely, Sokoloff, Taylor & Zafman

[57] ABSTRACT

The inventor discloses a bidirectional communication system for electric power load management and distribution automation application, and the like, wherein outgoing control signals to a plurality of remotely located receivers and transmitters are sent using an existing standard AM broadcast station using small angle subaudible quadrature modulation. The broadcast signal is detected by narrowband synchronous receivers phase-locked to the carrier component of the broadcast station. The radio frequencies of the plurality of reverse link transmitters are closely spaced and synthesized from frequency of said broadcast carrier and their time of transmission, digital bit streams, and message frames are all synchronized from the broadcast signal. The broadcast station thereby orchestrates all communication activity to and from the plurality of remote locations to optimize traffic flow and maximize a priori information to all components to significantly increase reliability. A unique fast Fourier transform processor synchronized by the broadcast station is employed in the central receiver to detect back link transmission.

22 Claims, 13 Drawing Figures

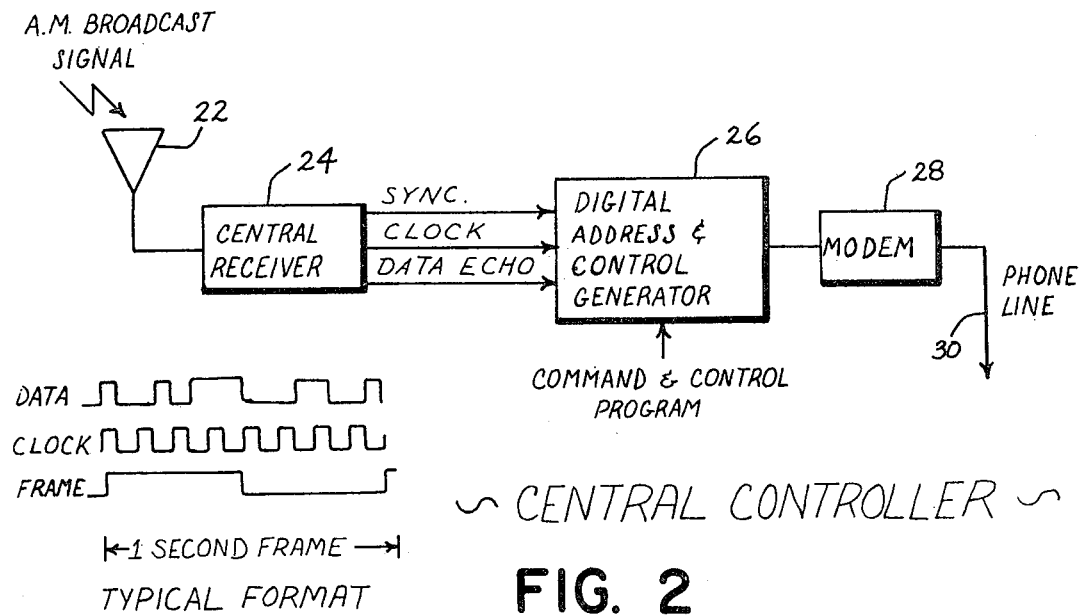
FIG. 2A
FIG. 2
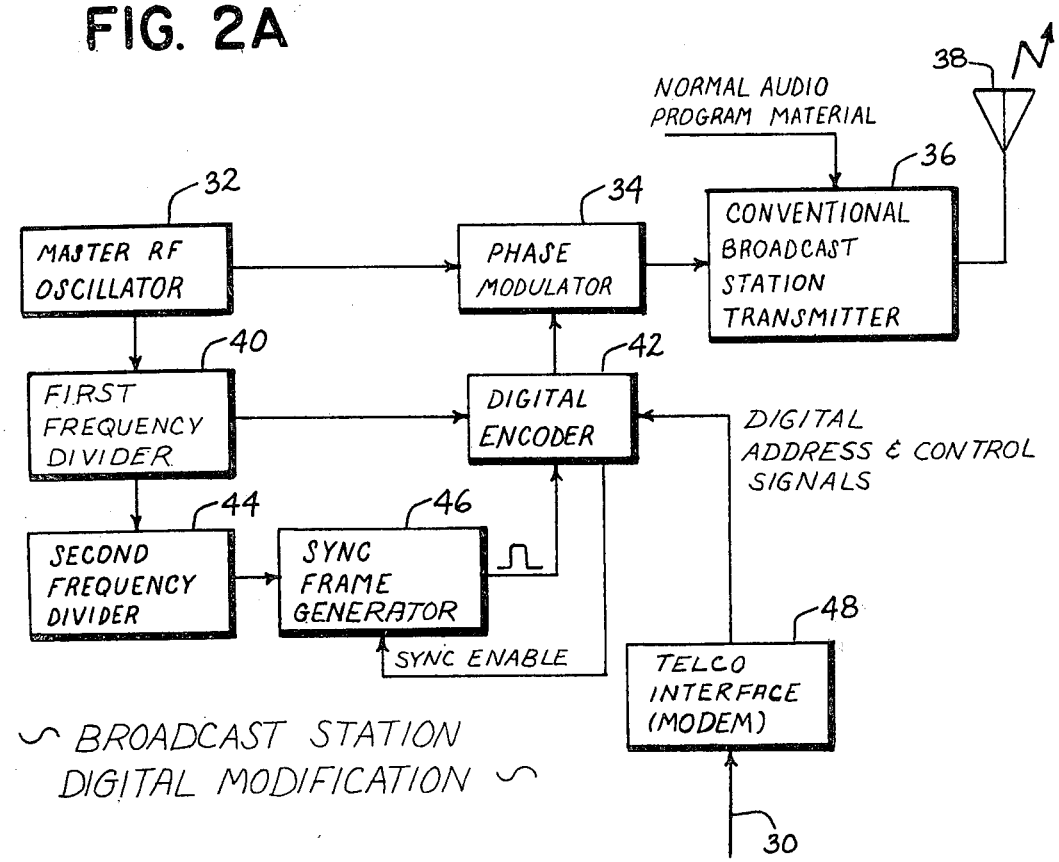
FIG. 3

FIG. 4 — DIGITAL CONTROL RECEIVER

FIG. 9 ~ SYNCHRONOUS SUPERHETERODYNE RECEIVER ~

~BIDIRECTIONAL COMMUNICATION SYSTEM~

RADIO CONTROLLED
OVAL REGISTER
WATT-HOUR METER

RADIO CONTROLLED
CIRCUIT BREAKER

~ CENTRAL REVERSE LINK
RECEIVING SYSTEM ~

BROADCAST SYSTEM FOR DISTRIBUTION AUTOMATION AND REMOTE METERING

FIELD OF THE INVENTION

This invention relates to a system which provides a reliable bidirectional communication link from an Electric Utility central control point, or the like, to a large number of customers for such purposes as electric power load management, meter rate setting, and remote meter reading. A synchronized technique using radio methods is disclosed having either one-way or optional two-way capability.

Utilities have expressed need for means to rapidly communicate signals en masse to or from their many customers for such purposes as selectively switching off non-vital appliances, (this is known as "load management"), for remotely setting meter rates, for remote setting of thermostats, for automatic meter reading, and for automating their power distribution system. The first three purposes require a one-way communication link from the power company to the user, while the second two purposes require bi-directional communication means. The disclosed system provides both these "forward link" and "reverse link" roles.

The method herein disclosed employs a standard AM radio station to broadcast control signals to the customers through a very narrow band quadrature modulation process which has the advantage of providing highly reliable communication without interfering with the normal use of the AM radio station. In reverse transmissions from customer to Utility my system employs very narrow band radio signalling means synchronized to the AM broadcast signal.

This invention is related in part to my U.S. Pat. No. 4,117,405, titled, "Narrow Band Communication System," issued on Sept. 26, 1978, and is essentially the same as my invention disclosed and filed in the U.S. Patent and Trademark Office Disclosure Document Program File Number 067889 on Jan. 25, 1978; which document is referred to herein and made a part of this file jacket by reference.

The system disclosed here represents a significant departure from communication technologies which have heretofore been proposed for these applications. In the forward link my system employs an existing powerful AM broadcast station in a novel manner which has no effect whatsoever on the regular use of the broadcast station and, with a minor modification of existing stations it can provide reliable coverage over more than 50,000 square miles at very low cost. In the reverse link my system uses a very narrowband radio communication method which, for example, enables more than 500,000 separate power meter readings to be accomplished every hour, all on one single conventional radio channel (e.g. at VHF) and is consequently very conservative of the radio spectrum. It also permits several utilities to efficiently share the same reverse-link radio channel.

The disclosed control receiver to be installed at each customers premise is relatively simple and inexpensive and is capable of controlling, via the AM station, numerous separate household appliances as commanded by a central controller at the power company. The transmitter for each residence which communicates information back to the power company, and aforesaid control receiver, could both be mounted inside the customer's circuit breaker box; or they can be mounted in an add-on meter extender housing which provides rapid and inexpensive installation.

DESCRIPTION OF PRIOR ART

The principal techniques competing to accomplish the communication functions required in load management and distribution automation include telephone, power line carrier communication, ripple control, radio, and various combinations of these.

Telephone methods are inherently attractive because a telephone line is frequently available to the controlled point. Unfortunately, the vast majority of U.S. telephone lines are incorporated in what is referred to as the "switched network" and because of this only a very small percentage of the telephones can be used at any one time. En masse communication is not possible without an enormous and expensive modification of the telephone plant. Furthermore, not all controlled points are accessable to existing phone lines and a significant number of new lines would be necessary for complete coverage. Of all competing systems, this is probably the most expensive.

An alternative system called "power line carrier", known for decades, uses the distribution power lines to carry signals and suffers many inherent problems arising from the necessity to propagate through many power transformers and because of the numerous multiple paths and noise-like signals which can exist between utility and consumer. The greatest advantage of a power line carrier method is that the entire system may be owned and under the control of the power company. In general, the power line distribution system must be compensated and carefully checked a priori to insure reliable communication; this is both time consuming and expensive.

The third system, called ripple control, has been used successfully in many foreign countries as well as in a few applications in the United States. They also operate over power lines but only one-way and are relatively expensive installations because large and powerful signal injection equipment must be installed at each Utility substation. Furthermore, their data rate is necessarily low because these systems operate at very low carrier frequencies and require undesirably narrow signal bandwidth, consequently denying "instantaneous" communications. For example, well known existing systems take 20 seconds or more of communication time to affect a reliable one-way signal transmission.

Radio offers a fourth alternative but formidable problems exist for conventional radio systems which typically occupy a complete radio channel about 10 KHz wide during each transmission. Their companion forward link receivers must cope with relatively high radio noise levels and this, coupled with FCC transmitter power limitations, leave much to be desired in the way of reliable transmission. Moreover, a private central radio transmitter erected by a power company to send control signals will generally be assigned a high radio frequency (e.g. VHF) and this results in relatively expensive control receivers for each consumer, when compared to the inexpensive low frequency receivers used in my invention.

An even more formidable problem is faced by radio systems intended for the reverse link. High power transmitters for each consumer are impractical and probably would pose a radiation hazard under existing regulations. Consequently, only low powered devices of a few watts will be acceptable. En masse reliable transmissions from such devices over relatively long ranges (20 miles or more) has never been successfully accomplished using consumer grade devices. A major advance in radio technology is necessary; this inventor believes the system disclosed herein provides this.

SUMMARY OF THE INVENTION

Forward Link. It is evident that a powerful AM broadcast station signal such as I propose to employ can be reliably detected over effective ranges of 150 miles or more. For mass communications to the public AM radio is very attractive. The important question, however, is how to adapt these AM stations for our purpose without disturbing their regular use.

Although the use of AM broadcast stations to broadcast control or alerting signals is not especially new, the specific manner in which this inventor employs it is unique. It is fairly obvious that if one simply injects a control tone signal on an AM broadcast station using conventional amplitude modulation (AM), as others have done in the past, then cross-talk (mutual interference) can easily develop between the control signal and the regular audio program of the station. Furthermore, if this control signal tone is "sub-audible", then it will have difficulty passing through the radio station's modulation transformer and will aggravate the regular audio program because it can readily swing the station's modulation transformer flux through nonlinear regions and result in increased intermodulation distortion. One solution is to make the control signal relatively "weak", but this aggravates its transmission reliability; in addition, the effective radiated power level of the normal audio program will be diminished, hence the station's coverage is effected, possibly raising administrative (legal) difficulties because of potentially reduced service area, advertising rate adjustments, etc. Though these deleterious effects are not obvious to non-engineers, careful measurements and testing reveal these inherent problems.

My system avoids all the above difficulties by using a modulation process which is not only compatible with the station's regular AM process but also compatible with proposed stereo equipment which may be employed by the station in the future; a service the FCC is presently considering to authorize.

It is well known to radio engineers that the residual RF "carrier" power which remains in the AM process contains two thirds (67%) or more of all the available radiated power, and this is essentially unused. The usable "audible" signal power is only one third (33%) of the total radiated RF power, at most; this is what conveys the music and voice signals. The disclosed quadrature modulation process effectively harnesses this 67% unused carrier power, but has no effect on the regular 33% audio power. My system can thereby salvage about 25% of the total radiated power. Consequently, my system is fully compatible with the regular AM station program. It can be shown that since it is sub-audible, it is also compatible with future stereo systems that may be added to the station under proposed new FCC rules. Most important, my sideband energy lies within 20 Hz of the carrier where FCC rules require the carrier to exist, hence no illegal AM carrier "suppression" results.

The above points can be illustrated by a computation. If a small angle phase modulation index (say $\pm 30$ degrees) is selected in my system then it can be shown that approximately 25% of the residual carrier power will be translated into usable sidebands. These could be positioned between 8 and 18 Hz from the carrier center frequency, for example. Thus for a 50 KW radio station about 12,500 watts of previously unused effective radiated power would be harnessed by my system. By contrast one can only use a simple AM tone maximum modulation level of about 5% (0.05) since higher levels could cause serious difficulties as noted before. Thus the usable sideband power under these latter circumstances would be proportional to the square of 0.05 or about 0.25% of the total power; resulting radiated power is about 125 watts for a 50 KW broadcast station. Thus my control signal is consequently 100 times stronger (12,500 watts versus 125 watts) compared to the simple sub-audible "AM tone" modulation method proposed by others.

Conventional AM tone systems are inherently limited to a very low data rate ($1 \approx$ BPS), lest their control signal sidebands seriously interfere with the broadcast station audio program. My system is not so restricted and can transmit data at least 5 to 10 times faster. Conversely, the broadcast station's audio program power will spill into the conventional AM tone "channel", whereas it will not in my system, increasing their error rate.

The effect of static and RF noise from industrial sources and other stations are also minimal in my system because of the well known "FM quieting" effect which applies to the quadrature modulation detection circuits in the control receivers employed in my system.

Many of the above points are discussed in my aforesaid U.S. Pat. No. 4,117,405 (pg. 3, line 24–31; pg. 7, line 34–57).

A very significant improvement is realized by my unique method of synchronizing digital bit streams to the AM station RF carrier frequency. This process permits very precise time keeping (clocking) to take place at each consumer location and allows simple and reliable digital circuits to be employed at low error rates. It also allows me to accurately order (queue) consumer-to-utility reports and identification signals, and this materially simplifies design of the companion transmitter for two-way communication and greatly increases overall system traffic capacity.

Since the control receiver for each customer operates at relatively low RF frequencies, all the electronic circuits can be fabricated on low cost integrated circuits. This permits fabrication using hybrid circuit techniques in hermatically sealed packages that are both rugged and reliable, yielding an expected life in excess of 20 years.

Important additional optional functions which my control receiver accomplishes include communication of annunciator signals to a beeper inside a customer's home to alert them that load control steps are in process or to communicate a "brown-out" warning. It also incorporates timer circuits to automatically reset power to interrupted appliances after a few minutes.

Reverse Link. The availability of clear radio channels for private use by a Utility, for example, is essentially nil. One must contend with a very crowded radio spectrum and ofter must share channels. Even if granted a private channel, "cross-talk" from adjacent channels can seriously degrade performance. An essential ingredient for reliable error free communication is a high signal-to-noise ratio, hence minimizing noise is a vital goal.

In our applications the messages which are communicated from the consumer to the utility are relatively short, on the order of 30 to 60 bits. It is therefore theoretically possible to employ very narrow band "subchannels" to reduce noise substantially and thereby increase transmission reliability. Bandwidths on the order of 50 to 100 Hz would be adequate for our purposes. Unfortunately, the instability of practical frequency controlling devices (i.e. a RF quartz crystal) does not permit us to simply assign narrowband subchannels to each of our consumers because the inherent RF carrier drift will result in serious intermingling and confusion of signals.

My system solves this problem by synthesizing the radio carrier frequency of each of the consumer reverse link transmitters (and the centrally located utility companies receiver) from the radio carrier frequency of the AM broadcast station. This provides very precise control of each consumer transmitter frequency. In addition, the same digital clock synchronization circuits associated with the forward link consumer control receiver are shared by the transmitter of the reverse link. This greatly simplifies the problem of digital circuit design and guarantees precision timing of message frames and data bits in each of perhaps one million or more customer reverse link transmitters.

The use of these narrowband communication processes for the reverse link not only enables me to achieve the mandatory high signal-to-noise ratio at relatively low transmitter RF power, it also permits me to transmit from a great many consumers on a single radio channel simultaneously. I intend to multiplex and transmit meter readings (or other data) from up to 128 different consumer locations simultaneously on 128 subchannels, all on a single conventional radio channel. For example, my intended data rate of 30 bits per second per consumer (per meter) coupled with 128 simultaneous transmissions of 30 bits each (e.g. a 10 decimal digit report per consumer) results in an overall system ability to communicate 500,000 independent consumer meter reports per hour. Furthermore, my essentially independent radio subchannels permit "space division" of customers into geographical cells so that several different Utility companies can efficiently share one radio channel in densely populated areas by using different subchannels.

As an illustrative example, the signal-to-noise performance for my typical 4-watt radio transmitter for each consumer is equivalent in performance to a conventional transmitter of over 400 watts. Moreover, my transmitter can cut through voice signals or other crosstalk that my be on the same channel at the same time. This is because my effective bandwidth for each subchannel is under 1% that of conventional radios, thus rejecting 99% of the noise seen by them; also, my digital circuits are tightly locked-on a priori. A utility might consequently share a channel with voice users, if necessary.

I also disclose herein a new high capacity central radio receiver design for detecting reverse link signals which employs fast Fourier transform (FFT) digital techniques in a unique manner; i.e. the FFT time windows, sampling rate, and reference RF frequency are all synchronized with, (thus governed by) the broadcast station RF carrier frequency and fractional divisions thereof. Moreover, a time and frequency multiplexing method orchestrated by the broadcast station signal is disclosed which capitalizes on the high signal processing capacity of the FFT central receiver.

The scientific rationale upon which my system is based is well established in communication theory. However, the practical realization of the significant advantages herein disclosed have not been previously possible because the crucial problem of a priori overall system synchronization, both at radio frequencies and at digital bit stream levels, have not previously been satisfactorily solved. My employment of a powerful existing AM broadcast station which is always on the air provides the key element which solves both the reverse as well as the forward link overall synchronization problems simultaneously.

BRIEF DESCRIPTION OF THE DRAWINGS

FIG. 2 illustrates the principal components comprising the central controller which may be located at a power company's facilities and is connected to a local broadcast station by phone line or by other means.

FIG. 3 is a block diagram of the modifications necessary to a broadcast station so that it can receive digital address & control signals from the central controller, digital phase modulate the broadcast station carrier, and broadcast the digital control signals.

FIG. 4 is a block diagram of a digital control receiver that detects the broadcast control signals, demodulates and decodes them, and outputs control signals to electrical appliances, distribution automation apparatus and the like.

FIG. 5 illustrates various applications of the remote digital control receiver including control of multi-register watt-hour meters, thermostat relays switches for cycling air conditioners, and the like.

FIG. 7 is a block diagram of a multi-function synchronous tone receiver which can detect, demodulate and decode multi-tone coded address and control signals to thereby control several electrical appliances and the like.

FIG. 10 is an overall simplified block diagram of a bi-directional communication system employing my invention for load management, distribution automation, remote metering and the like.

DESCRIPTION OF THE PREFERRED EMBODIMENT

Figure 1:
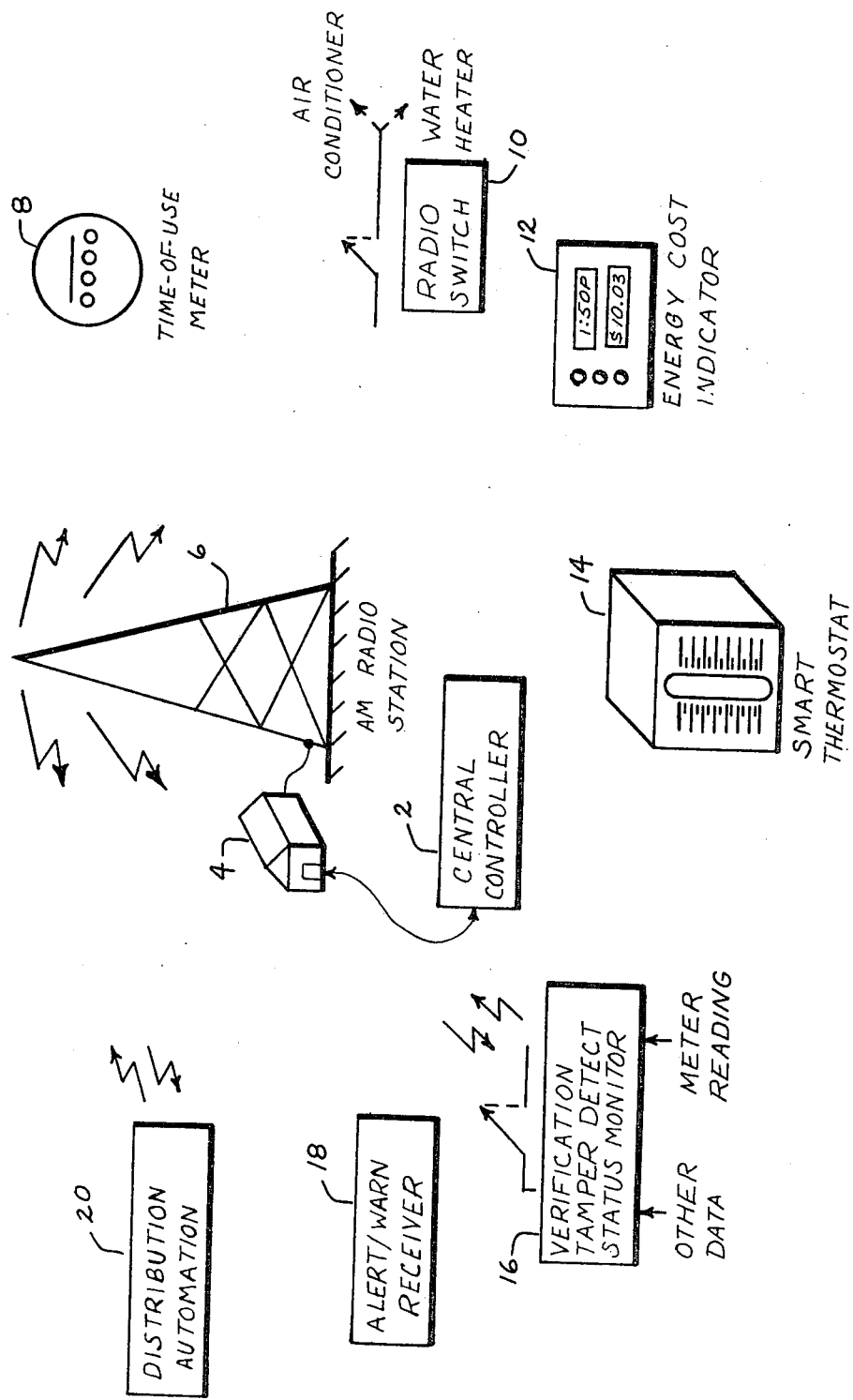
FIG. 1 is a simplified overall diagram of the broadcast system for distribution automation and remote metering and shows its typical applications.

FIG. 1 graphically illustrates various applications of my invention. A central controller 2 generates address and control signals in accordance with a preselected schedule arranged by a power company for use during times of high energy demand, for example. In a principle embodiment of my invention these address and control signals are generated by digital coding techniques wherein the bit streams and message frames are synchronized to transmissions from a local broadcast station in a manner to be described in the following. The address and control signals generated by 2 are communicated by telephone line, or by other conventional means, to a broadcast station transmitter 4 where they synchronously phase modulate the carrier of the broadcast station using a small angle (for example ±30 electrical degrees) subaudible process which does not interfere with the normal transmissions of the broadcast station which are transmitted simultaneously. The phase encoded signals are connected to antenna 6 and are thereby radiated to a plurality of remotely located control receivers associated with devices 8 through 20 that lie within the communication range of the broadcast station.

The remotely located control receivers detect, demodulate and decode the coded broadcast signal transmissions and selectively control the operation of a multi-register time-of-use electric watt-hour meter 8 and switches 10 that interrupt the thermostat circuit of an air conditioner and electric hot water heater, and like devices. They may also switch on a "smart thermostat" 14, or it may provide the latest electricity cost rate to an energy cost indicator 12.

Additional important applications of my invention include the transmission of black-out or brown-out warnings to local residents through an alert and warning receiver 18. These alert signals may also be used in conjunction with a nuclear power generating plant disaster alerting plan. The alert and warning application is particularly important at this time because suitable means are not readily available for quickly warning the general population at any time. Since the control receivers of my invention are expected to be operating 24 hours per day and are intended to be widely deployed, receiver 18 is an attractive application.

Other applications of my invention are to control the power company's distribution system itself, i.e. the control of sectionalizing switches, power factor capacitors, and similar functions can be affected using my control receivers 20.

The verification, tamper detection and status monitoring application device 16 requires bi-directional communications means to be described in a later part of this specification.

FIG. 2 illustrates the circuit arrangement employed at the power company's central controller. A central receiver 24 detects radio signals via antenna 22 and monitors the radio transmissions from the local broadcast station employed in my invention, deriving therefrom timing information for synchronizing its operations. It also detects an "echo" of the data (i.e., address & control signal groups) transmitted by the broadcast station which originated at the central controller. Thus central receiver 24 provides feedback information to varify proper transmission of address & control signals generated by 26. Digital address & control generator 26 employs conventional discrete digital circuits, or it may employ any one of many widely used microprocessors presently on the market.

Generator 26 develops digital addresses corresponding to any one specific remotely located control receiver address code, or it may generate a hierarchy of group addresses, such as the so called "SCRAM" address code which power companies employ when they wish to immediately address all their remotely located control receivers simultaneously. In any event the address portion of the digital address & control signal is generated by 26 in accordance with a prearranged control schedule devised by the power company, or any specific address may be generated at any time desired by using well known "interrupt" techniques. The control portion of the digital address & control signal is the message or command associated with the address portion and this defines specific functions which are to be accomplished by any one specifically addressed remotely located control receiver, or by any combination of such receivers.

The digital bit streams representing address & control signals are time formatted into specific groups called frames. An illustrative signal format, presented in FIG. 2A, shows a message frame comprising 16 data bits and occupying a time duration of one second. For example, 11 bits could comprise the address and 5 bits could be the control instructions. Of course other time formats would be equally applicable in my invention. Most important however is the fact that specific time intervals occupied by any given frame, or by any given bit within the frame, is uniquely and very specifically defined and orchestrated by the broadcast station using a synchronizing technique which will be described in following paragraphs. Suffice it to say at this point that these specific time intervals are conveyed to the digital address and control generator 26 by the central receiver 24; that is, the sync signals defining a message frame, and the clock signal defining digital bit stream intervals.

Thus the signals generated by 26 are time formatted to convey the control requests presented by external control apparatus (such as a power company computer) which contains prestored command sequences developed by the power company and sent to generator 26 via a hard wire connection, for example. The output of generator 26 is connected to a telephone modem for transmission to a local broadcast station; these are conventional communication methods. A microwave link or other methods could also be used to communicate address and control messages from the central controller to the broadcast station.

Control generator 26 also periodically transmits "transmit sync" request signals to the broadcast station through modem 28. These transmit sync request signals might be transmitted once per hour, for example or they may be transmitted more frequently during stormy weather or lightening conditions to insure that all remote receivers are properly in synchronism.

FIG. 3 illustrates the circuit arrangement of the new equipment to be installed in the local broadcast station so it may retransmit signals using the methods of my invention. Master RF oscillator 32 is a conventional device present in essentially all broadcast stations. Subsequent circuits normally driven by this master oscillator 32 are shown in FIG. 3 as broadcast station transmitter 36. The new components which I introduce comprise the remaining blocks in FIG. 3. Namely, a first frequency divider 40 which divides the frequency of master oscillator 32 to a low frequency equal to the digital bit stream clock rate, for example 16 bits per second (BPS). A second frequency divider 44, driven by divider 40, further reduces the frequency of master oscillator 32 to the desired message frame rate of one frame per second, in my example.

Thus master oscillator 32 precisely determines, in a manner soon to be evident, the basic digital bit stream clock rate and the message frame rate for all component in the system of my invention. Sync frame generator 46 simply reshapes the output of divider 44 giving it a unique code shape easily distinguishable from data bits and prepares this sync signal for transmission at any time requested by the central controller. In this way the sync code is transmitted to remotely located control receivers. It will be pointed out later in this specification that synchronizing signals need not be transmitted continuously; only at rather widely separated intervals, such as once per hour. This is because all of the remote control receivers also derive their basic timing information from a radio frequency oscillator phase locked to the carrier of the broadcast station and consequently there is zero (or negligible) drift between the master clock time reference of the remote receivers and the master clock reference used by the broadcast station and by the central controller at the power company. Thus all components of my system are locked to the carrier frequency of the broadcast station.

Digital encoder 42 receives the clock and frame synchronizing signals as inputs as well as digital address & control signals. All these signals are in synchronization since they are timed from the station's carrier frequency as previously noted. Encoder 42 modulate the carrier of the broadcast station through phase modulator 34 at small angle subaudible rates. Transmitter 36 is also amplitude modulated simultaneously by the normal transmissions of the broadcast station. Antenna 38 radiates these signals. Telco interface modem 48 is connected to the central controller modem 28 by a telephone line 30 as previously noted to provide address & control signals to digital encoder 42.

Figure 4:
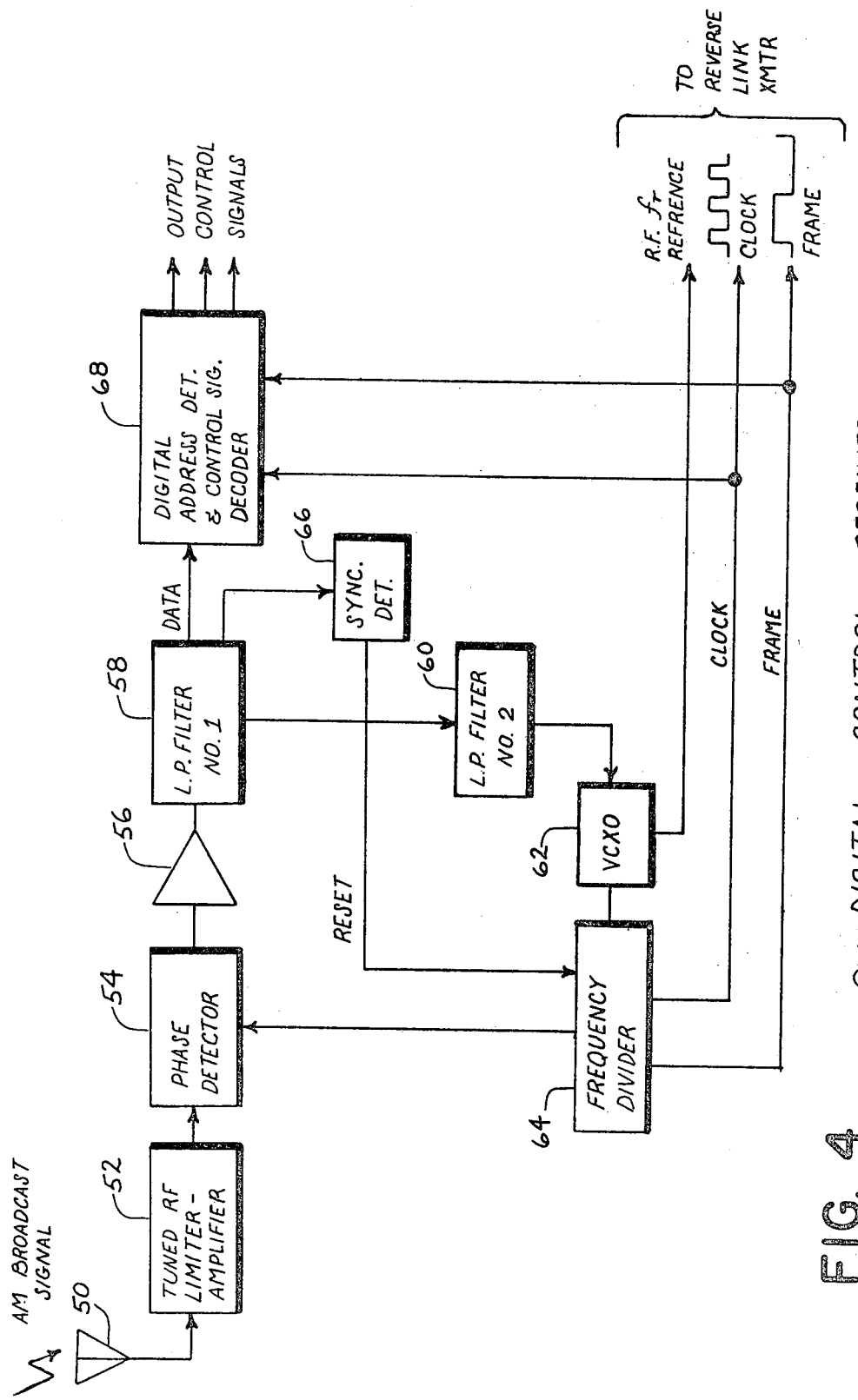

FIG. 4 is a block diagram of a control receiver which may be located remotely at a power company's customer premises to effect control of electric appliances and other devices in the desired manner. It may also be located on the power company's distribution system to effect control of sectionalizing switches, capacitor bank switching, and like functions. Of course it may also be used in other types of systems, such as to control traffic lights, or for remotely controlling roadside signs, and numerous other applications.

The digital control receiver in FIG. 4 comprises a receiving antenna 50 that detects signals transmitted by broadcast station 4 and sends them to limiter-amplifier 52 which amplifies and eliminates the undesired amplitude modulation. The output of 52, is connected to phase detector 54, which also receives a reference signal from voltage controlled crystal oscillator (VCXO) 62 at the same frequency as the broadcast station carrier frequency through frequency divider 64. The output of phase detector 54 comprises a "control signal" whose amplitude is proportional to the difference in phase between the broadcast station carrier frequency and the locally derived signal from VCXO 62. This error signal is amplified by 56 and passed through two low pass filters 58 and 60 which smooth the error signal and apply it to control the frequency of VCXO 62. VCXO 62 also drives a frequency divider chain 64 which has multiple outputs. One of these outputs is a frequency approximately equal to the carrier frequency of the broadcast station prior to signal "lock up" but precisely equal to it after lock-up of VCXO 62, or a precise multiple of the carrier broadcast frequency, because of the well known action of feedback arrangement set forth in FIG. 4. Typically the circuit in FIG. 4 thus described is called a phase lock loop.

The output of low pass filter 58, in the absence of any phase modulation on the broadcast station carrier, is essentially a signal of constant amplitude. However, in the presence of phase modulation in the manner described the output of filter 58 becomes a replica of the modulated signal input to phase modulator 34 at the broadcast station. It is in this manner that the desired digital signals are communicated from the broadcast station to a plurality of remotely located control receivers, the signal appearing at the output of low pass filter 58. The digital signal output of filter 58 is detected by digital address & control signal decoder 68. The address portion of the coded signal is compared to a prestored address to determine if it is either a unique or a group address for which it must respond, and if the signals carry its preset address, then the command portion of the signal is decoded and sent out to control any, or all, of a variety of external devices such as electric appliances, watt-hour meters, and the like, depending on the specific control code received.

I shall now describe the synchronizing operation of the receiver circuits shown in FIG. 4. As previously noted, bit stream clock rates and message frame rates are basically established at the broadcast station by frequency divider means driven by the broadcast station's master oscillator 32. Each remotely located receiver incorporates a VCXO 62 that is precisely at the same frequency as the broadcast station carrier frequency, or a multiple of it, consequently it is obvious that the digital bit stream clock and message frame rate regenerated at each remote receiver using the same frequency divider method used at the broadcast station makes these rates identical to those at the broadcast station. However the phase of these frames and digital bit stream clocks may not be initially the same as that of the broadcast station, consequently the receiver may be out of digital "sync", though in sync at radio frequencies. Sync detector 66 of FIG. 4 receives the output of low pass filter 58 and detects the special coded synchronizing signals transmitted by the broadcast station and resets frequency divider 64, thereby bringing it into synchronism with the bit stream clock and frame clock of the broadcast station.

There are many variations of the overall system I have just described that will become obvious to engineers skilled in the art. Nevertheless this arrangement provides a practical working system within the spirit of my invention, though I am aware it may be practiced by other arrangements based on the art taught herein.

Figure 5:
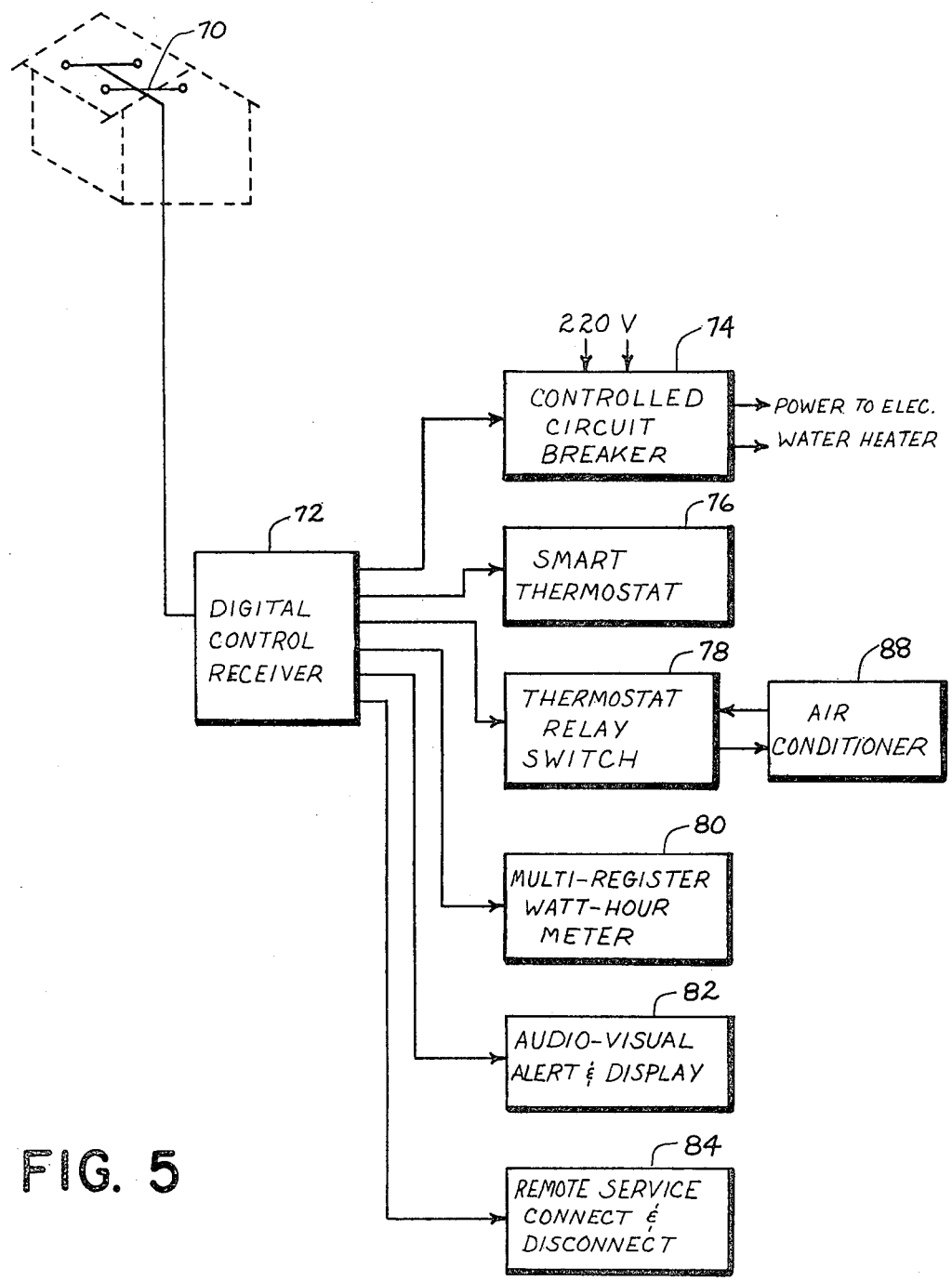

FIG. 5 illustrates several applications using my digital control receiver 72, which receiver comprises the circuit arrangement shown in FIG. 4, or variations of it. One unique improvement illustrated in FIG. 5 is antenna 70 which comprises the electric power wiring existing in a residence. "Antenna" 70 is particularly important in electric power load management applications because other types of antennas, for example small ferrite rods have the disadvantage of tampering susceptibility. There is a possibility a customer wishing to avoid receipt of control signals may try to cover the antenna with metal foil or metal grids. In applications where control receivers are used to switch a multi-register watt-hour meter from one rate to another at different times of day, some customers may try to cover the antenna when the meter is on a low cost rate, and thus avoid paying the higher cost rates mandated by public utility commissions. For example load management systems using radio devices at VHF can suffer this problem. It is not possible to cover antenna 70 of my invention. In one embodiment of my receiver, both the AC power for the receiver and the RF signals are taken from the household power line simultaneously thereby simplifying the installation. Of course a small ferrite antenna may be useable in some applications. I visualize the application of both a ferrite antenna and the house wiring antenna simultaneously in some installations.

The various applications illustrated in FIG. 5 are evident from the drawing consequently I shall only summarize highlights of their operation here. The controlled circuit breaker 74 comprises a combination of an existing circuit breaker modified to provide for power interruption upon receipt of a signal from my digital control receiver 72. Control receiver 72 can be made quite small consequently it can be mounted within the envelope of a conventional two pole circuit breaker. The combination is referred to here as a radio controlled circuit breaker. It has the advantage that it can be easily plugged into existing electric circuit breaker panels.

The so-called "smart thermostat" (a trade name of the Honeywell Corporation) is a device which is programmed to provide a selected temperature-time profile in buildings to minimize energy consumption. In many applications it is desirable to have this programmed temperature profile initiated only when heavy power consumption situations exist. By using the combined digital control receiver 72 and a smart thermostat 76 the temperature profile can be initiated by a command from the central controller 2.

Another application involves control receiver 72 driving a small relay switch 78, the combination being put inside an air conditioner 88 so that it interrupts the thermostat circuit to cycle the air conditioner on and off upon receipt of commands from power company central controller 2. The advantage is that relay 78 is relatively small with a capacity of about 1 ampere and it makes use of the expensive higher powered switching device already in the air conditioner which may have a capacity of 40 amps or more, thus reducing cost and simplifying the installation.

Both federal and state legislation currently in effect require power companies to consider tariff schedules on the basis of time-of-use rates consistent with the cost of generating electrical energy, which costs vary at different times of day, and also seasonally. Electric power meters with two or more accumulating dials are being proposed for this purpose. However it is difficult to control their schedule on a day to day and season to season basis. Digital control receiver 72, in combination with multi-register watt-hour meter 80 provides a solution.

The audio visual display 82, used in conbination with digital control receiver 72 provides a means to alert the general population during emergencies. This application has already been described in a previous section of this specification.

The ability to remotely connect or disconnect various electric services to customers is a valuable function power companies desire. Digital control receiver 72 in combination with, for example, a latching power relay 84 can provide this service upon request of a customer who may be moving out of his residence, for example.

Figure 6:
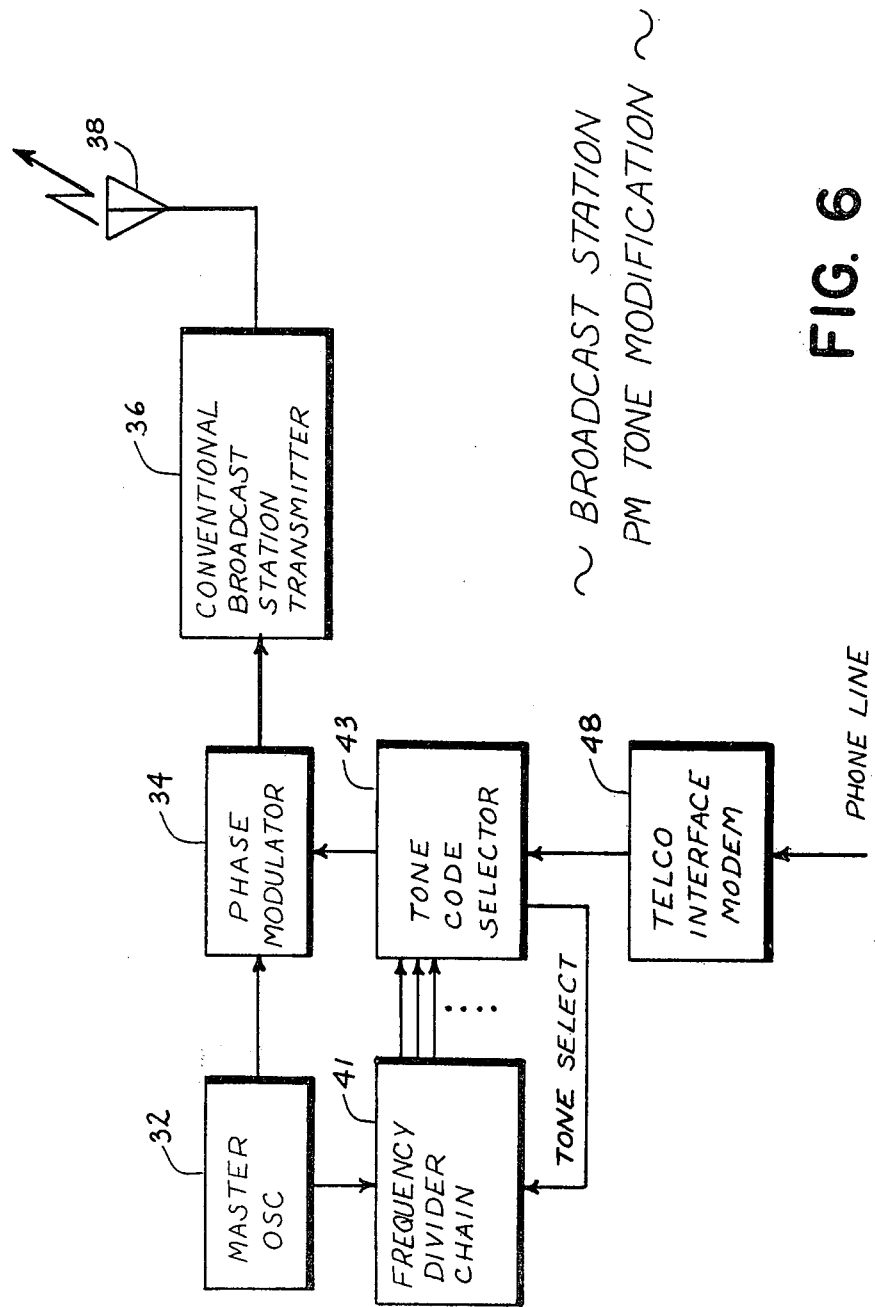
FIG. 6 is a block diagram of alternative modifications necessary to a standard broadcast station so that it may receive address and control commands from a central controller and encode these commands by frequency tone code sequences which phase modulate the AM radio station carrier for broadcasting.

I shall now describe an alternative method of practicing my invention employing a synchronous tone coding method for phase modulating the broadcast station carrier. This could be done simultaneously with the digital phase modulation discussed above. FIG. 6 shows the modifications necessary to an existing broadcast station to provide precise tone modulation at several subaudible frequencies "N". This method is synchronized in a manner analogous to the method described above. This is because the various frequencies N are derived from the master oscillator 32 of the broadcast station by a frequency divider 41. This is functionally equivalent to divider 40 and 44 in that the tone codes are thereby synchronized to the station carrier frequency much like the data bite previously described.

Frequency divider 41 generates a plurality of subaudible synchronized tone frequencies derived from master oscillator 32, consequently having a stability and precision consistent with the precision of oscillator 32. In practice master oscillator 32 has a stability on the order of one part per million of drift per year, which is very accurate and stable. Tone code selector 43 selects any one or a combination of synchronized tones as commanded by central controller 2 as defined by the power company. The selected tone codes phase modulate broadcast station 36 through modulator 34 in essentially the same manner already described. These signals are radiated by antenna 36. Telco interface modem 48 serves the function of interfacing the central controller 2 via telephone line, or other means, to tone code selector 43. The selector 43 also controls frequency divider chain 41 to provide different ratios and output frequency combinations.

Figure 7:
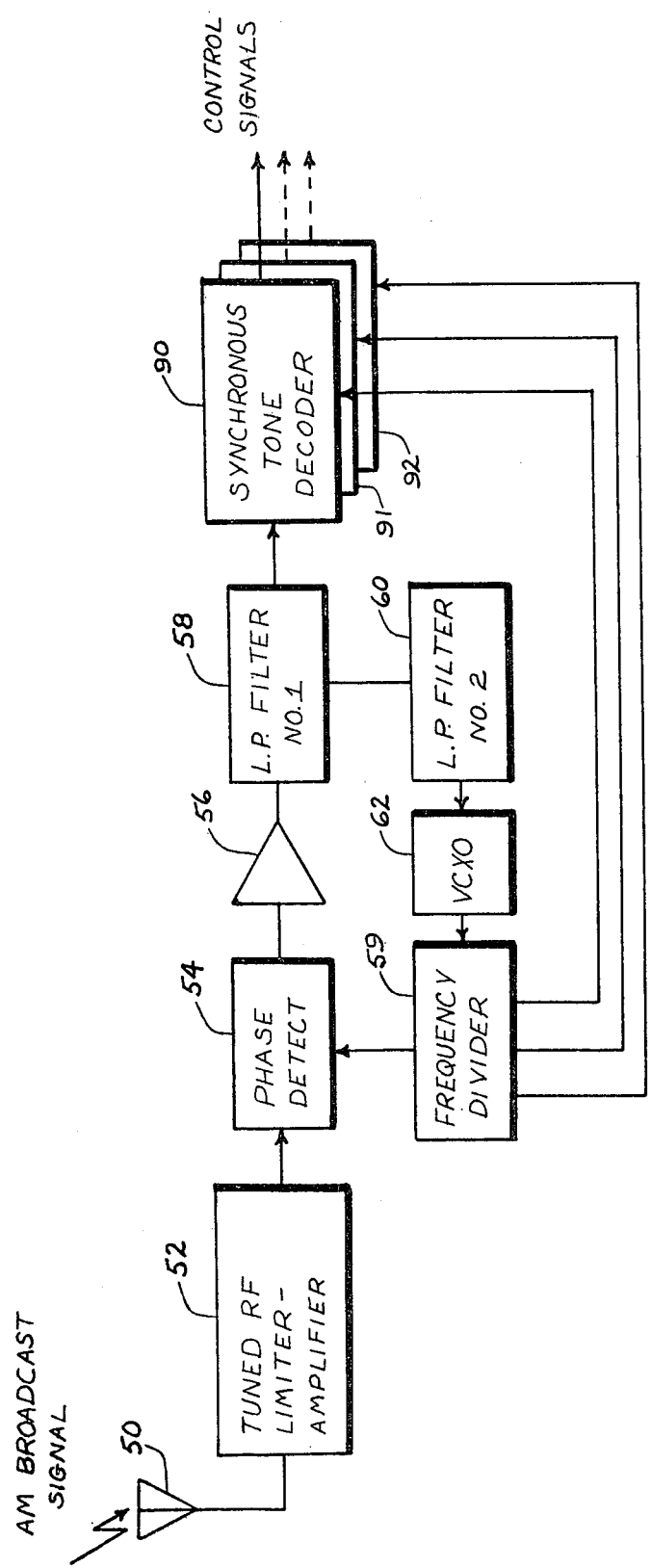

FIG. 7 is a block diagram of a synchronous tone code receiver for use in conjunction with the brodcast system shown in FIG. 6. A phase lock loop arrangement including VCXO 62, frequency divider 59, and their related parts function essentially in the same manner as the like numbered parts in FIG. 4. However in FIG. 7 the operation of frequency divider 59 provides output tones rather than bit stream and message frames. Divider 59 provides a plurality of tones commensurate with the number of different address codes and control functions which one desires to exercise. The output of low pass filter 58 is a replica of the tone combinations transmitted by the broadcast station. These tones are connected to the input of synchronous tone decoders 82, 84, 86, . . . . Tone decoders 82, 84, 86 also receive the output frequencies from divider 59, which are a precise set of frequencies preselected by the power company to correspond to some of the precise frequencies generated at the broadcast station. Decoder 90 shown in FIG. 7 is one of a plurality of decoders, one per each tone frequency which comprise a particular receiver's identification code and command response structure. The important advantage of the receiver shown in FIG. 7 is that no analog circuit components such as inductor-capacitor networks or resistor-capacitor networks are necessary to generate the various tone frequencies because these frequencies are precisely regenerated by frequency divider 59. Thus problems of tone frequency drift are eliminated. The circuit arrangement of FIG. 7 can be constructed using only semiconductor elements and can therefore be fabricated using large scale integrated (LSI) methods which are well known. Consequently a receiver could be entirely fabricated on a single semiconductor IC "chip" at very low cost.

Figure 8:
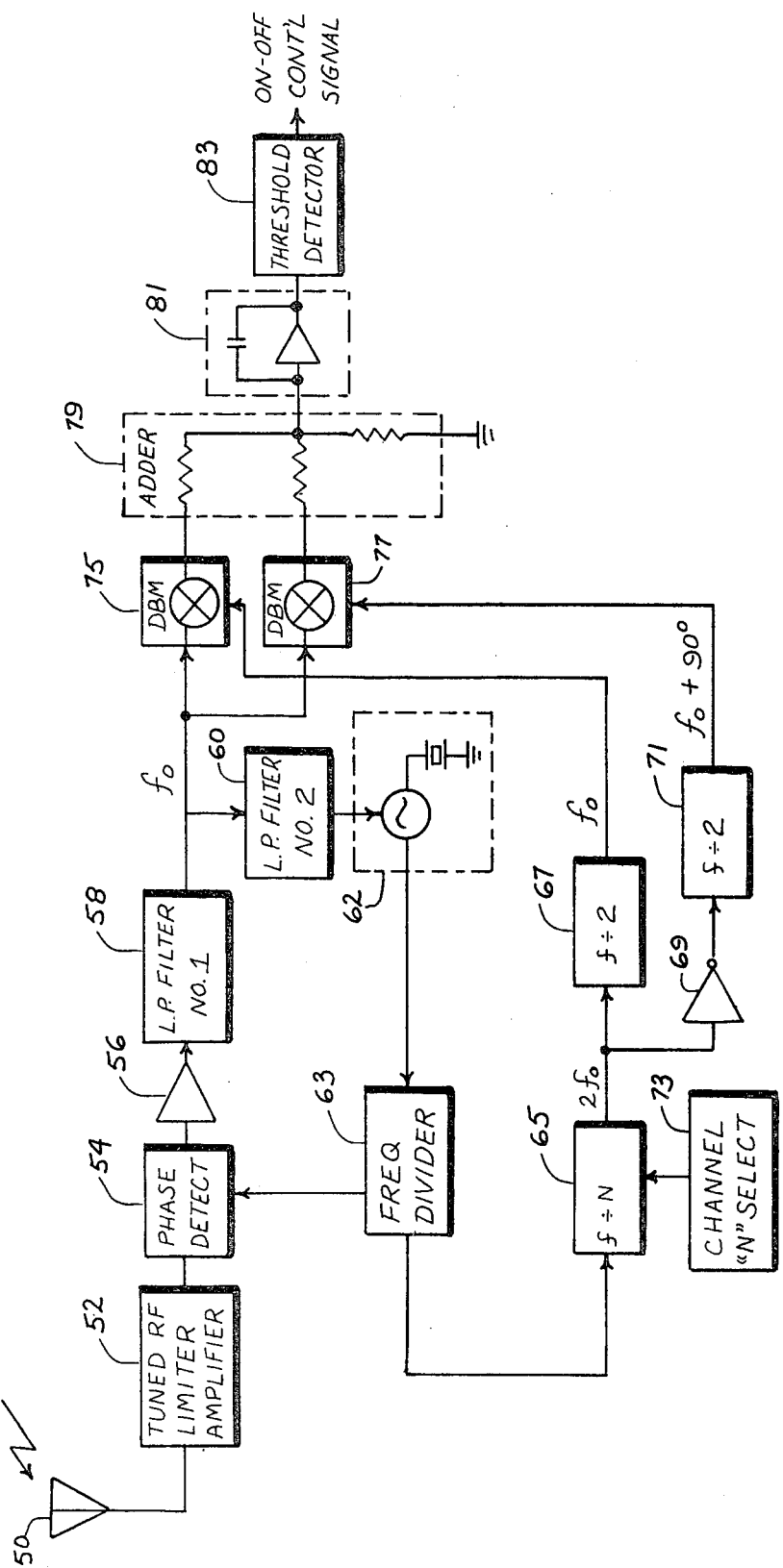
FIG. 8 is a block diagram of a simple single function tone detection receiver which detects any single tone frequency "N" and thereby controls any one electrical appliance assigned the code frequency "N".

FIG. 8 discloses another tone code receiver design that is simpler and lower cost than the receiver shown in FIG. 7 which is designed to receive and respond to only one single tone frequency $f_o'$ (of course the tone at frequency $f_o'$ could be cycled on and off in a digital pattern to thereby communicate digital signals). The component parts in FIG. 8 comprising a phase-lock loop operate essentially the same as in FIG. 7.

In FIG. 8 the tone out of low pass filter 58 is split into two parallel channels and send simultaneously to two double balanced mixers 75 and 77. The output of divider 63 is sent to another frequency divider 65 which divides by a factor N defined by channel selector 73, yielding an output tone frequency $2f_o$. The output of frequency divider 65 is split into two paths: one path includes inverter 69 which flips $2f_o$ tone frequency 180 degrees prior to sending it to a single stage frequency divider 71. Single stage frequency divider 67 receives its signal directly from frequency divider 65 without inversion. The result is that the output of divider 67 at frequency $f_o$ is 90 degrees out of phase with the output of divider 71, also at frequency $f_o$. This is necessary to provide double balanced mixers 75 and 77 with reference signals in quadrature; this is required to permit mixers 75 and 77 to properly detect the signal from filter 58, if it is at the proper frequency $f_o'=f_o$, regardless of any arbitrary phase which $f_o'$ may have. Adder circuit 79 vectorily sums the output of mixers 75 and 77 thereby providing a relatively constant amplitude signal to integrator amplifier 81, regardless of the phase of $f_o'$ signal tone from filter 58, but having an amplitude proportional to the amplitude of signal $f_o'$ only if frequency $f_o'$ is identical to the frequency $f_o$ and $f_o+90°$ from frequency dividers 67 and 71. If the frequency $f_o'$ and frequency $f_o$ are not identical, then the output of adder 79 and integrating amplifier 81 will be small and well below the detection level of threshold detector 83. However, if $f_o'$ received from the broadcast station is identical to $f_o$ generated at the control receiver, then the output of integrating amplifier 81 will be high and well above the threshold of detector 83. A control signal output is then generated and sent to apparatus such as air conditioners, watt-hour meters, etc.

The circuit shown in FIG. 8 can be fabricated entirely using integrated circuit techniques on a single chip, with the possible exception of the integrating capacitor in integrator 81. The resulting receiver is expected to be very inexpensive and reliable. Note again the important advantage that this tone coding receiver is fully synchronous at tone frequencies $f_o'$ very precisely established because the tone frequencies $f_o'$ which designate various code functions and generated at the broadcast station are precisely identical to the frequencies $f_o$ regenerated at each independent remotely located receiver. The precision is due to the fact that $f_o$ and $f_o'$ are derived by frequency divider means phase-locked to the carrier frequency of the broadcast station.

Figure 9:
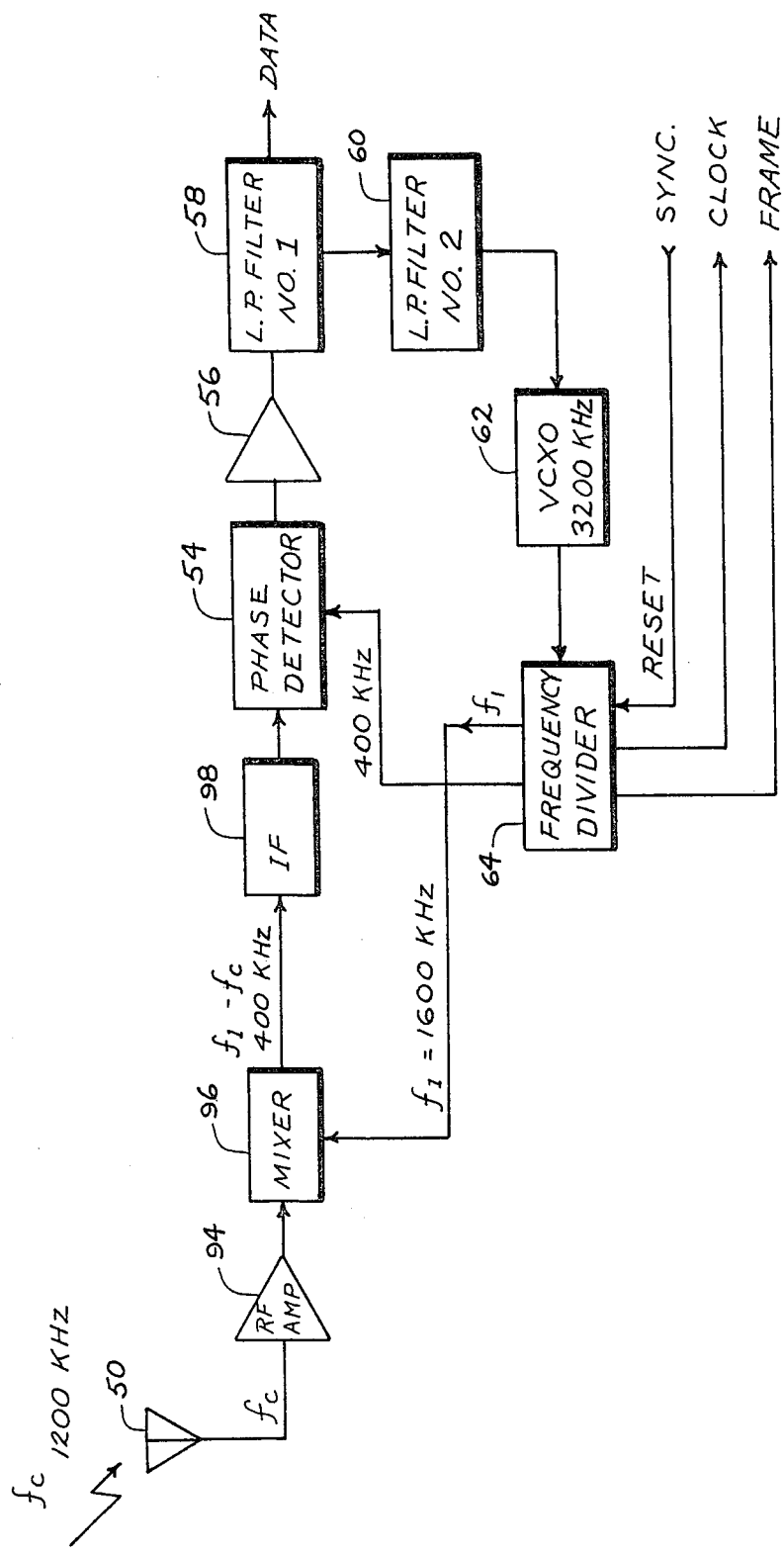
FIG. 9 is a block diagram of a synchronous superheterodyne receiver which provides synchronous detection of either digital or tone coded signal transmission from the broadcast station (Note: the words "broadcasting" and "AM radio station transmission" are used synonymously).

FIG. 9 shows another design improvement comprising a synchronous superheterodyne receiver. In the receiver designs previously described, amplification at radio frequencies is accomplished at the incoming broadcast station frequency. It is frequently desirable, especially in very high gain sensitive receivers, to employ an intermediate frequency amplifier to minimize the possibility of undesirable RF feedback and oscillation. The receiver shown in FIG. 9 accomplishes this in a synchronous manner. Antenna 50 detects signals from a broadcast station at, for example, frequency $f_c$ equal to 1200 KHz. Signal $f_c$ is amplified by 94 and sent to mixer 96, which mixer also receives a local oscillator frequency $f_l$ from frequency divider 64. The beat frequency comprising intermediate frequency $f_l-f_c$ is sent to intermediate frequency amplifier 98 which has its output connected to phase detector 54. Phase detector 54 also receives a reference signal from frequency divider 64 and outputs a signal proportional to the difference in phase between the two input signals to thereby effect a phase-lock loop operation essentially the same as described previously in connection with FIG. 4. The important point is that VCXO 62 is in effect phase-locked to a fixed multiple of the broadcast station carrier frequency. Since both mixer 96 and phase detector 54 receive their reference signals from frequency divider 64 the entire process is fully synchronous. Divider 64 outputs data, a bit stream clock, and message frame rate information in essentially the same manner previously described in referenced to FIG. 4. The receiver design of FIG. 9 can in fact be a "front end" RF section alternative to the front end design of the receiver of FIG. 4. For example, the receiver of FIG. 9 will function identically to the receiver of FIG. 4 if one inserts the digital address detector & control signal decoder 68, and sync detector 66 to rest divider 64. Alternatively, a bank of synchronous tone decoders 90, 91, 92 . . . could be employed at the output of filter 58 in the receiver of FIG. 9 to enable it to detect tone coded transmissions. In this case frequency divider 64 could be replaced by 59 which would output the desired reference tone frequencies so that decoders 90 . . . could function in the manner previously described.

Figure 11:
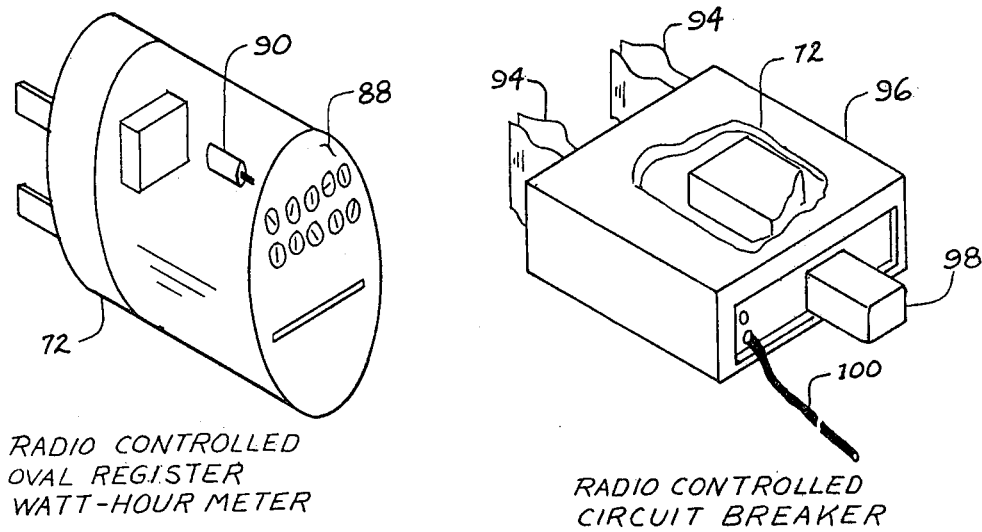
FIG. 11 illustrates various packaging arrangements that simplify and reduce the cost of installing my control receiver within conventional circuit breaker panels or behind multi-register power meter cases.

FIG. 11 shows two packaging arrangements for my control receiver. In one arrangement the control receiver 72 is located behind a multi-register watt-hour meter in order to control the solenoid 90 that actuates the gear mechanism driving different accumulating register dials 88. The advantage here is that the entire receiver, since it is small and receives both its power and its radio signal from the power wiring of the house, can be easily mounted behind existing multi-register meters. A second packaging arrangement, also shown in FIG. 9, mounts my control receiver 72 within a conventional circuit breaker package 96. Package 96 could include a circuit breaker, or only my receiver 72. In this manner my receiver may be easily installed in existing circuit breaker panels by inserting it into a vacant slot. Upon insertion into the panel, both AC power for the receiver and the radio signal are connected to control receiver 72 through terminals 94. In the event that both a control receiver and a circuit breaker function are integrated into package 96, then the usual function of resetting the circuit breaker can be effected through switch handle 98. If receiver 72 is selected to be a multi-function type, then the additional control signals can be sent to other devices via wire 100.

Bidirectional Embodiment. In my aforementioned invention U.S. Pat. No. 4,117,405 I disclose in detail a narrow-band radio communication system synchronized to a broadcast station in a manner related to what I have already described above. Consequently I shall only summarize in this specification the basic operations set forth in aforesaid patent, setting forth in detail the new improvements which I have since discovered.

Figure 10:
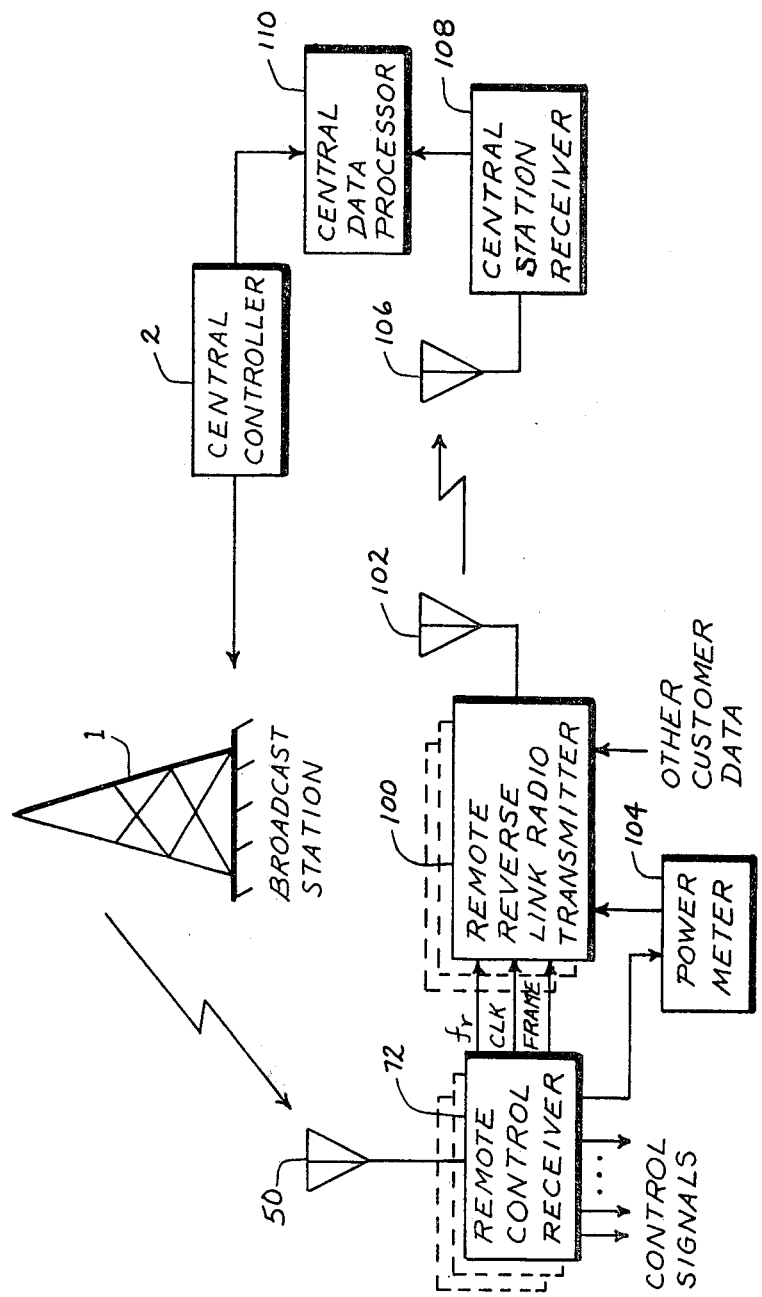

Referring to FIG. 10, remote control receiver 72 comprises the receiver described in connection with FIG. 4, or variations of it. A plurality of such receiver 72 could be located throughout the service area of a power company, for example. Associated with each control receiver 72 is a remote reverse link radio transmitter 100 which is intended to receive meter readings from power meter 104, or other customer data, and relay this information through antenna 102 to antenna 106 to a central station receiver 108. Receiver 108 might be located at a power company's central receiving station.

The important improvements in the arrangement of FIG. 10 is the use of the same digital bit clock and message frame timing employed in the forward link. In other words, receiver 72 provides transmitter 100 with the following information (see FIG. 4); a radio reference frequency $f_r$, a digital clock, and a frame sync signal. This information is shown at the bottom of FIG. 4 captioned "to reverse link transmitter". It is in this manner that the broadcast station can in effect orchestrate all operations at remote locations of receiver 72 and transmitter 100 so that all these independent sites can synchronously receive control information and report meter readings or status reports back to a central location in a smooth time interleaved manner. This is very important to maximize traffic flow since an alternative method using only random reporting would seriously suffer because of reduced traffic rates necessary to avoid conflicting simultaneous reports from various locations.

The operation of synthesizing the carrier frequency radiated by transmitter 100 from the broadcast station carrier frequency is described in detail in my aforesaid, U.S. Pat. No. 4,117,405. My present improvement constitutes the synchronization of the bit stream and message frames used at transmitter 100 and central station receiver 108. As a consequence central station receiver 108 can fully anticipate the time at which any particular data bit, message frame, meter reading or status report from sites will arrive and furthermore, as will be pointed out later in this specification, the RF signal amplitude from each remote site is also carefully catalogued at central station receiver 108. Consequently receiver 108 has all the a priori information it needs to optimize its operation.

Central data processor 110 comprises a conventional computer which may be at the power company, for example. Processor 110 could set up the overall scheme for polling the remote sites to initiate remote meter reading, to "cycle" the load at the remote sites, to automatically prepare billing invoices, etc.

A significant improvement which I have discovered subsequent to filing my application for U.S. Pat. No. 4,117,405, is the use of a fast Fourier transform (FFT) processor at central station receiver 108. This improvement is illustrated in the simplified block diagram of FIG. 12. In U.S. Pat. No. 4,117,405 I disclosed a method for synthesizing a multiplicity of radio transmitter frequencies at precisely defined closely spaced frequency intervals (on the order of a hundred cycles) by phase-locking the carrier of each of the transmitters to a fixed multiple of the frequency of the broadcast station. I also disclosed in aforesaid patent a method for detecting these closely spaced transmissions by synchronous techniques wherein a central receiver incorporates a multiplicity of local reference oscillators which are similarly locked to the carrier of the broadcast station. In this manner the differential error in radio frequency between the multiplicity of remotely located transmitters and the central receivers are minimized.

Figure 12:
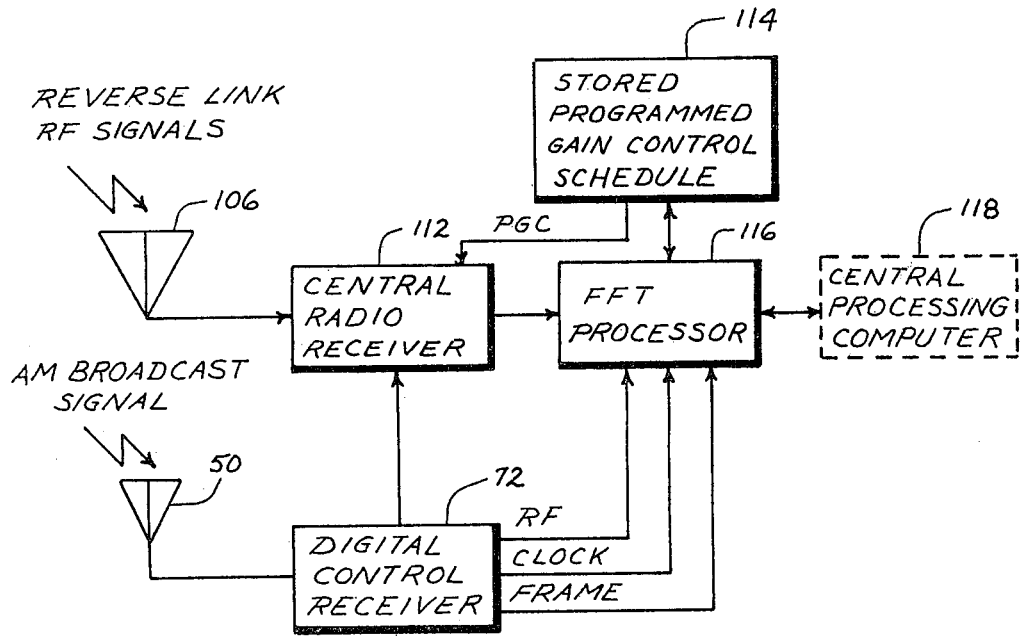
FIGS. 12 and 13 are simplified block diagrams of a high capacity central receiver which detects radio transmissions from remotely located meter reading and status reporting devices which relay information to the power company.

In my improvement, shown in FIG. 12, I employ a new method for detecting my closely spaced independent radio reverse link transmissions. The fast Fourier transform (FFT) processor essentially comprises a unique digital computer algorithm which efficiently computes a Fourier series representation of arbitrary signals of finite duration presented at its input. The unique aspect of the FFT is that the number of computations necessary to compute the Fourier transform of the input signal is significantly reduced to a point where even small low cost computers, in fact even so-called microcomputers, can be employed to implement the FFT algorithm very effectively. I shall not dwell on the FFT algorithm in this specification since it is well known and widely discussed in the literature.

A significant problem exists in the practical application of an FFT processor, however. First, a decision must be made as to the specific time interval over which the FFT computation will be accomplished. This is known as the selection of the "time window". Many factors enter into this decision such as the resolution desired in the resulting power spectral data, the amount of weighting which may be necessary to condition the incoming data, the acceptable level of spurious and undesired frequency folding, etc.

I have made the following important discovery in this connection. Since the information which my reverse link transmitters send back to my central receiver is completely orchestrated by the broadcast station, I can define a priori the time window to be employed in my FFT processor. For example, in one embodiment I communicate information simultaneously (and synchronously) from 128 remotely located amplitude modulated digital transmitters at the rate of 16 bits per second from each. Hence every 16th of a second (i.e. about 60 milliseconds) I must examine the entire spectrum of say a 10 KHz wide radio channel to determine if there is a "0" or a "1" logic bit transmitted from the 128 independent transmitters. Consequently I select a "time window" of 60 milliseconds, which time window is synchronized by the clock output of digital control receiver 72 in FIG. 12. Thus the FFT processer is programmed to accomplish a Fourier series computation during 60 millisecond time window across a frequency spread of 10 KHz (i.e. 128 remote transmitters spaced 80 Hz apart equals 10 KHz approximately). At the conclusion of the 60 milliseconds the FFT processor outputs a power spectral density distribution having fidelity sufficient to distinguish whether a logic "1" exist or does not exist in any of the 128 subchannels. In effect I take a "time cut" across the entire 10 KHz radio channel in order to determine the first bit transmitted by each 128 separate transmitters. 60 milliseconds later I repeat this process to determine the second bit from each of the 128 transmitters, and so forth. I have consequently shown how the FFT processor can be precisely synchronized to optimize its time window.

There is another important decision which must be made relating to the sampling rate of the FFT processor. Within any given 60 millisecond time window we must decide how many samples must be taken and this is related to the width of the time window and the desired fidelity of the resulting power spectral distribution. In our case we have a fortuitous opportunity to select the sampling rate at a precise submultiple of the incoming radio frequency in order to minimize the "drift" or "strobing" effect in the FFT output which results if the sampling rate, the time window, and the incoming frequencies are varying, hence not commensurate. I solve this problem by selecting the sampling rate as a fixed multiple of the radio frequency of the broadcast station which is optimum.

Figure 13:
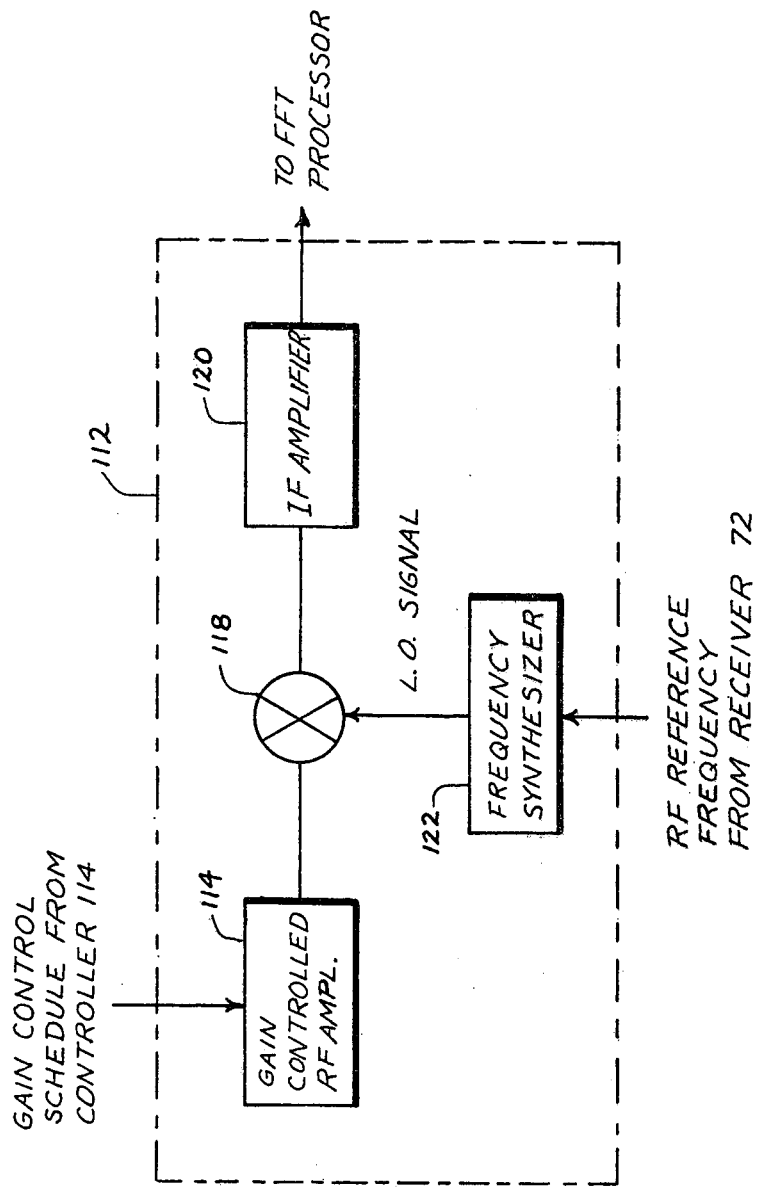

Another FFT application problem relates to the "drift" of the FFT output power density distribution due to drift in the "local oscillator" of central radio receiver 112 of FIG. 12. This is in essence the same as the sampling problem just discussed. Here again I synchronize the local oscillator signal of receiver 112 (FIG. 13) by using synthesizor 122 based on the radio reference frequency out of digital control receiver 72. I describe in detail methods to accomplish this in my aforesaid U.S. Pat. No. 4,117,405. IF amplifier 112 drives the FFT processor.

In summary, my FFT processor improvements lie in synchronization of the FFT time window, sampling rate, and reference radio frequency to the frequency and time synchronizing information available out of the broadcast station. These improvements are significant and simplify the design of the FFT processor and its precision.

I have also discovered a further improvement. Since my remote reverse link transmitters are at varying and arbitrary distances from the central radio receiver 112 (FIG. 12) their signal level will be widely differing. Since the so called adjacent channel suppression capability (i.e. the resolution) of the FFT processor, or any spectrum analyzer for that matter, is finite and on the order of 40-60 dB, it is advantageous if all incoming signals are more-or-less at the same amplitude. In my system I arrange for such a condition to exist by selecting the time at which I poll various reverse link transmitters so that all signals of comparable amplitude report essentially at the same time. Consequently strong signals do not report at the same time as weak signals. In this manner I significantly improve the ability to distinguish a "0" or "1" logic bit transmitted simultaneously be reverse link transmitters operating on adjacent sub-channels.

The gain of receiver 112 is also arranged to vary using amplifier 114 (FIG. 13) in accordance with the amplitude of transmitter group signals. This is referred to as programmed gain control (PGC). Such a "schedule" is generated by the stored programmed gain control device 114 (FIG. 12), based on information presented to it from the FFT processor 116 and, indirectly the information out of digital control receiver 72 and processor 118.

A central processing computer 118 accomplishes the overall function of coordinating all activities at the receiving station of FIG. 12 including maintaining a catalogue of all the remotely located receiver identification codes, appliances to be controlled, power company load cycling scenarios, etc.

Obviously many modifications and variations of the present invention are possible in light of the above teachings. It is therefore to be understood that within the scope of the appended claims the invention may be practiced otherwise than is specifically described.

What is claimed is:

1. A radio communication system for selectively addressing and controlling a plurality of remotely located apparatus comprising in combination:
   (A) central controller means adapted to generate digital address & control signals for transmission to a local AM radio broadcast station, said signals being synchronized to special sync signals broadcasted by said AM radio station,
   (B) a local AM radio broadcast station adapted to generate and broadcast special sync signals derived from its master oscillator and adapted to receive and broadcast digital signals received from said controller by modulating the phase of its normally broadcasted radio frequency carrier at small angle subaudible rates that do not suppress and spread its normally unused residual carrier power by more than a predetermined amount nor interfere with normal transmissions of said radio station that are simultaneously broadcasted,
   (c) a plurality of remotely located addressable digital radio receivers controlling a plurality of external apparatus and tuned to detect and phase-lock to residual carrier frequency of said broadcast station to synchronously demodulate and decode said special sync signals and said address & control signals and selectively respond to control said apparatus.

2. The communication system of claim 1 wherein said central controller comprises:
   (A) central receiver adapted to detect and phase-lock to residual carrier of said broadcast station to derive therefrom special sync signals and address & control signals,
   (B) digital address & control generator means connected to output of said central receiver and adapted to receive commands from external apparatus and reformat them into digital address & control signals and "transmit sync" request signals synchronized to said special sync signal, said "transmit sync" requests being sent at long time intervals, such as hourly,
   (C) a modem connected to the output of said digital address & control generator to transmit said output to said AM radio station.

3. The central controller of claim 2 wherein said digital address & control generator further incorporates means to compare the address & control signals received from said central receiver to the address & control signals which it generates in order to detect errors and generate corrected output signals for subsequent rebroadcasting.

4. The communication system of claim 1 wherein said AM radio broadcast station modification comprises:
   (A) a first frequency divider means connected to output of existing broadcast station master oscillator to derive therefrom a digital bit stream clock rate,
   (B) a second frequency divider means driven by said first frequency divider to generate a message frame rate,
   (C) a first input of a sync frame generator means connected to output of said second frequency divider and a second sync frame generator input connected to one output of a digital encoder means to generate therefrom a special sync code output signal upon receipt of a sync enable signal from said encoder,
   (D) said digital encoder means receives output of said first frequency divider at a first input and output of said sync frame generator at a second input, and said digital address & control signals and sync request signals at a third input and generates synchronized digitally coded output signals at a first output, and sync enable signals at a second output, (E) a phase modulator means connected between said broadcast station master oscillator and conventional broadcast station circuits normally following said oscillator and adapted to receive signals from said digital encoder to phase modulate the carrier of said broadcast station in a manner which does not interfere with the normal transmission of said broadcast station.

5. The broadcast station system of claim 4 wherein said digital encoder receives digital address & control signals from said central controller means through a telephone interface modem.

6. The communication system of claim 1 wherein said remotely located radio receiver comprises:

(A) a receiving antenna to detect signals from said broadcast station, a tuned RF limiter-amplifier connected to output of said antenna, a phase detector having a first input connected to output of said limiter-amplifier and a second input connected to an output of frequency divider chain means having multiple outputs and driven by a voltage controlled oscillator, (B) an amplifier and a first and second low pass filter means connected in series to output of said phase detector, said second filter controlling the frequency of said voltage controlled oscillator in a phase-lock loop arrangement whereby said oscillator is maintained precisely at the carrier frequency of said broadcast station, or a multiple of it, (C) a digital address detector and control signal decoder means connected to output of frequency divider means and to output of said first low pass filter to synchronously detect and compare address portion of said signal to individual or group address stored therein and thereby determine if it must respond, if so to synchronously decode the control portion of said signal and output control signals to external apparatus, (D) a sync detector means connected to output of said first low pass filter and adapted to detect and recognize special sync signals broadcasted by said AM radio station and to output a reset command to said frequency divider means upon receipt of said sync signal thereby maintaining identical digital bit stream and message frame synchronization existing at broadcast station.

7. The communication system of claim 1 wherein said radio receivers are connected to the electrical power wiring of buildings to receive therefrom their energizing power and the radio signals from said broadcast station, said building power wiring acting effectively as an antenna, said receivers being adapted to provide control signals on output connecting wires to external apparatus to control their function selectively upon command of said address and control signal.

8. The communication system of claim 1 wherein said receivers are packaged in a form identical to conventional electrical circuit breakers and wherein said receiver derives its power and receives its radio signals through the terminals of said circuit breaker.

9. The control receiver of claim 8 wherein said circuit breaker package includes a conventional circuit breaker adapted to provide power interruption upon receipt of a command from said copackaged receiver.

10. the communication system of claim 1 wherein said radio receiver and external apparatus comprise:

(A) a multiregister watt-hour meter to measure power consumption on a plurality of sets of indicating dials as engaged by a selector mechanism, (B) said radio receiver mounted behind said plural dial sets to selectively engage any one of said plurality dials as commanded by said address & control signal.

11. The communication system of claim 1 wherein said external apparatus comprises a smart thermostat.

12. The communication system of claim 1 wherein external apparatus comprises an audio-visual alert and display to warn of emergency conditions.

13. A radio communication system for selectively addressing and controlling a plurality of remotely located apparatus comprising in combination:

(A) central controller means adapted to generate address & control tone code selection signals for transmission to a local AM radio broadcast station, (B) a local AM radio broadcast station adapted to generate tone coded signals derived from its master oscillator by frequency divider means and adapted to receive and broadcast the tone code selections received from said broadcasted radio frequency carrier at small angle subaudible rates that do not suppress and spread its normally unused residual carrier power by more than a predetermined amount nor interfere with normal transmissions of said radio station that are broadcasted simultaneously, (C) a plurality of remotely located addressable tone coded radio receivers controlling a plurality of external apparatus and tuned to detect and phase-lock to residual carrier frequency of said broadcast station to thereby demodulate and decode said tone coded address & control signals and selectively respond thereto to control said apparatus.

14. The communication system of claim 13 wherein said AM broadcast station adaptation comprises:

(A) phase modulator means inserted between existing master oscillator of said broadcast station and circuits normally driven by said oscillator, (B) frequency divider chain means having multiple outputs and selectable division ratios connected to second output of said master oscillator to thereby derive a plurality of subaudible tones phase-locked to frequency of said oscillator, (C) tone code selector means connected to plural outputs of said frequency divider and to output of an interface modem to receive tone code selection signals from said central controller, the output of said tone code selector being connected to said phase modulator to thereby modulate carrier of said broadcast station at small angle subaudible rates.

15. The communication system of claim 13 wherein said AM broadcast station adaptation comprises:

(A) a replacement oscillator means for the existing master oscillator means which can be phase modulated and which can drive circuits normally driven by said existing oscillator, (B) frequency divider chain means having multiple outputs and selectable division ratios connected to second output of said replacement master oscillator to thereby derive a plurality of subaudible tones phase-locked to frequency of said oscillator, (C) tone code selector means connected to plural outputs of said frequency divider and to output of an interface modem to receive tone code selection signals from said central controller, the output of said tone code selector being connected to said replacement oscillator to thereby phase modulate carrier of said broadcast station at small angle subaudible rates.

16. The radio communication system of claim 13 wherein said receiver is a synchronous tone control receiver comprising:

(A) receiving antenna means to detect signals from said broadcast station, a tuned RF limiter-amplifier means connected to output of said antenna, phase detector means having a first input connected to output of said limiter-amplifier and a second input connected to output of a frequency divider chain means, said divider having plural output taps and driven by a voltage controlled oscillator means, (B) amplifier and first and second filter means connected in series to output of said phase detector, output of said second filter being adapted to control the frequency of said voltage control oscillator in a feedback arrangement wherein said oscillator is precisely phase-locked to, and maintained at, the carrier frequency of said broadcast station, or a multiple of it, (C) plurality of synchronous tone decoder means each having a first input connected to output of said first low pass filter and a second input connected to preselected taps of said plurality of frequency divider outputs to thereby synchronously detect only broadcasted tone coded signals having tone code frequencies precisely identical to the frequencies generated by the preselected divider taps, (D) external apparatus connected to output of tone decoders and adapted to respond to only specific combinations of said output to selectively control said apparatus.

17. The radio communication system of claim 13 wherein said receiver is a single function tone receiver comprising:

(A) receiving antenna means to detect signals from said broadcast station, tuned limiter-amplifier means connected to output of said antenna, phase detector means having a first input connected to output of said limiter-amplifier and a second input connected to output of a first frequency divider means, said first divider being driven by a voltage controlled oscillator, (B) amplifier and first and second filter means connected in series to output of said phase detector means, the output of said second filter being adapted to control the frequency of said voltage controlled oscillator in a feedback arrangement wherein said oscillator is precisely phase-locked to, and maintained at, the frequency of said broadcast station signal, or a multiple of it, (C) second frequency divider means driven by first frequency divider and having a selectable divide ratio N defined by channel selector means, a third and fourth frequency divider means each dividing by factor of 2, said third divider being directly driven by output of said second divider and said fourth divider being driven by said second divider through a phase inverting amplifier, the output of said third and fourth frequency dividers being connected respectively to a first input of a first and second double balanced mixer, the second input of said first and second double balanced mixers being connected together and to the output of said first low pass filter, (D) adder circuit means having a first and second input connected to output of said first and second double balanced mixer to vectorily sum the output of said mixers and to connected said sum voltage to input of an integrating amplifier means, the output of said amplifier being connected to input of a threshold detector means in such a manner that when the frequency out of third and fourth frequency divider exactly equals the frequency of the signal from said first low pass filter the threshold of said threshold detector is exceeded, but not otherwise, (E) an external apparatus connected to the output of said threshold detector means to selectively respond thereto to provide remote control of said apparatus by said central controller.

18. The communication system of claim 13 wherein said radio receiver comprises a single conversion synchronous superheterodyne design comprising receiving antenna means to detect said broadcast signal connected to RF amplifier means which drives:

(A) the series combination of a mixer means driving an intermediate frequency (IF) limiter-amplifier means driving a phase detector means driving an amplifier driving a first and second low pass filter means which drives a voltage controlled oscillator means which drives a frequency divider chain means having plural outputs, (B) one output of said divider being connected to a second input of said mixer means and a second output of said divider being connected to a second input of said phase detector means in a phase-lock loop arrangement whereby said oscillator is forced to operate at a frequency precisely equal to the frequency of said broadcast station, or a multiple of it, (C) wherein the output from said first low pass filter comprises the desired data signal and wherein plural outputs from said frequency divider chain comprise the desired bit stream clock and message frame rate signals, (D) external circuit means connected to receive said output signals from said synchronous superheterodyne receiver so as to process said signals and selectively respond thereto to control said external apparatus.

19. A narrowband bidirectional radio communication system comprising:

(A) a plurality of independent paired radio receiver and transmitter means wherein said receivers are adapted to detect broadcasted sync and address & control signals from an existing standard AM broadcast station in its forward link, and said transmitters are adapted to accept RF reference and sync signals from its companion receiver and to accept reply message signals from message sources connected at their respective inputs and to transmit said reply message signals synchronously on a corresponding plurality of closely spaced radio carrier frequencies that are phase-locked to the carrier of said broadcast station in the reverse link to a central station receiver selectively in response to coded address & control signals transmitted from the local radio broadcast station;

(B) the central station receiver being adapted to receive said radio reply signals simultaneously at said plurality of closely spaced reverse link radio carrier frequencies, and to simultaneously detect said sync signals from said broadcast station and employ them to synchronously demodulate the radio signals from said plurality of remote transmitters, (C) central controller means adapted to generate digital address & control signals being synchronized to said sync signals broadcasted by said AM radio station.

(D) a local AM radio broadcast station adapted to generate and broadcast special sync signals derived from its master oscillator and adapted to receive and broadcast digital address & control signals received from said central controller by modulating the phase of its normally broadcasted radio frequency carrier at small angle subaudible rates that do not suppress and spread its normally unused residual carrier power by more than a predetermined amount nor interfere with normal transmissions of said radio station that are simultaneously broadcast.

20. The bidirectional communication system of claim 19 wherein said central station receiver comprises:

(A) a first antanna to detect broadcasted signals and drive a digital control receiver phase-locked to the carrier frequency of said broadcast station to derive therefrom a radio reference frequency, sync signals, bit stream and message frame rates, and address & control signals, (B) a conventional central radio receiver RF section including a second antenna to detect signals from said remote transmitters and a radio frequency amplifier having a programmable gain control connected to the output of said second antenna, and a first mixer connected to output of said amplifier, and a local oscillator phase-locked to a multiple of the reference radio frequency from said digital control receiver to thereby generate a stable intermediate frequency (IF) output from said mixer in the frequency range required by the FFT processor, (C) a fast Fourier transform (FFT) processor connected to the IF output of said central radio receiver to compute power spectral density distributions to thereby determine the presence or absence of signals on each of the plurality of frequencies transmitted from the corresponding plurality of remote transmitters, said FFT processor being programmed to operate using time windows, input data sampling rates, and reference radio frequency synchronized from said digital control receiver output signals.

21. The central receiving station in claim 20 wherein said receiving system further includes a stored program gain control means wherein a schedule of the expected signal amplitude from each of the plurality of remotely located transmitters is stored and sequentially retrieved to control the gain of said central radio receiver in a manner designed to minimize the difference in amplitude between sequentially reporting remote transmitter groups.

22. Central receiving system of claim 21 wherein said remotely located transmitters are selected to respond simultaneously in groups in such a manner that the signals arriving at the central receiving station from each of the plurality of reporting transmitters are nearly of the same amplitude.

* * * * *